United States Patent
Kurotsuka

(10) Patent No.: US 11,288,934 B2
(45) Date of Patent: Mar. 29, 2022

(54) MONEY DISPENSING MANAGEMENT APPARATUS, MONEY DISPENSING MANAGEMENT SYSTEM, AND MONEY DISPENSING MANAGEMENT METHOD

(71) Applicant: Glory Ltd., Himeji (JP)

(72) Inventor: Hirofumi Kurotsuka, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 16/767,600

(22) PCT Filed: Nov. 20, 2018

(86) PCT No.: PCT/JP2018/042774
§ 371 (c)(1),
(2) Date: May 28, 2020

(87) PCT Pub. No.: WO2019/107214
PCT Pub. Date: Jun. 6, 2019

(65) Prior Publication Data
US 2020/0410826 A1    Dec. 31, 2020

(30) Foreign Application Priority Data
Dec. 1, 2017    (JP) .............................. JP2017-232032

(51) Int. Cl.
G07G 1/01    (2006.01)
G07G 1/00    (2006.01)
G06Q 20/20    (2012.01)

(52) U.S. Cl.
CPC .............. *G07G 1/01* (2013.01); *G06Q 20/20* (2013.01); *G07G 1/0009* (2013.01)

(58) Field of Classification Search
None
See application file for complete search history.

(56) References Cited

U.S. PATENT DOCUMENTS

2010/0000837 A1*  1/2010  Hokazono ................ G07D 1/02
                                                  194/200
2010/0082443 A1*  4/2010  Folk ....................... G06Q 20/20
                                                  705/16

(Continued)

FOREIGN PATENT DOCUMENTS

EP    2800070 A1 *  11/2014  ............. G07D 11/32
JP    4210688 B2     1/2009

(Continued)

OTHER PUBLICATIONS

International Search Report and Written Opinion dated Feb. 5, 2019 for PCT/JP2018/042774 filed on Nov. 20, 2018, 10 pages including English Translation of the International Search Report.

(Continued)

*Primary Examiner* — Suezu Ellis
(74) *Attorney, Agent, or Firm* — Xsensus LLP

(57) ABSTRACT

The POS register 20 receives a withdrawal amount of cash to be withdrawn (S1), and transmits a withdrawal possibility determination request to a change machine 30 (S2a). The change machine 30 determines whether withdrawal is possible, based on the withdrawal amount in the withdrawal possibility determination request, inventory quantity data, and reserved-for-change quantity data (S2b), and transmits a determination result to the POS register 20 (S2c). When the determination result is "withdrawal impossible", the POS register 20 notifies that dispensing of money is impossible. When the determination result is "withdrawal possible", cash is dispensed from the change machine 30 (S9) through notification of a settlement request amount to a debit terminal 70 (S3), reading of a debit card (S4), a settlement request to a management server 100 (S5), reception of settlement permission (S6, S7), and dispensing instruction to the change machine 30 (S8).

11 Claims, 12 Drawing Sheets

(56) References Cited

U.S. PATENT DOCUMENTS

| | | | | |
|---|---|---|---|---|
| 2011/0054671 A1* | 3/2011 | Suzuki | .................... | G07G 1/01 |
| | | | | 700/219 |
| 2017/0256142 A1* | 9/2017 | Oe | ........................ | G07D 11/34 |
| 2018/0033229 A1* | 2/2018 | Arai | .................... | G07D 11/245 |

FOREIGN PATENT DOCUMENTS

| | | |
|---|---|---|
| JP | 2011-076298 A | 4/2011 |
| JP | 2015-060506 A | 3/2015 |
| JP | 2016-091485 A | 5/2016 |
| WO | 2013/099795 A1 | 7/2013 |

OTHER PUBLICATIONS

Extended European search report dated Jul. 27, 2021, in corresponding European patent Application No. 18882659.8, 8 pages.

* cited by examiner

FIG.9

NUMBER OF BANKNOTES/COINS AVAILABLE FOR CASH-OUT

| 10,000-YEN | 50 | 500-YEN | 20 | 10-YEN | 35 |
|---|---|---|---|---|---|
| 5,000-YEN | 10 | 100-YEN | 120 | 5-YEN | 20 |
| 1,000-YEN | 60 | 50-YEN | 50 | 1-YEN | 30 |

CASH-OUT PROMOTION 10,000-YEN, 1,000-YEN

MONEY DISPENSING MANAGEMENT APPARATUS, MONEY DISPENSING MANAGEMENT SYSTEM, AND MONEY DISPENSING MANAGEMENT METHOD

CROSS-REFERENCE TO RELATED APPLICATIONS

The present application is based on PCT filing PCT/JP2018/042774, filed Nov. 20, 2018, which claims priority to JP 2017-232032, filed Dec. 1, 2017, the entire contents of each are incorporated herein by reference.

TECHNICAL FIELD

The present invention relates to a money dispensing management apparatus, a money dispensing management system, a money dispensing management method, and a money dispensing management program, each for dispensing of money for multiple purposes.

BACKGROUND ART

Conventionally, in various stores such as convenience stores and supermarkets, a cash register having a point-of-sales function (hereinafter referred to as "POS register") and a money handling apparatus (hereinafter referred to as "change machine") communicably connected to the POS register, are often installed. For example, a store clerk scans a barcode attached to an item with a barcode reader of the POS register to specify the price of the item. When the clerk inserts money received from a customer into the change machine, change is dispensed from the change machine.

Meanwhile, it has been considered to use a POS register and a change machine for other purposes in addition to the aforementioned settlement for item purchase. For example, Patent Literature 1 discloses a cash-out system in which a customer is provided with cash that has been withdrawn from a bank account of the customer by using a debit card of the customer. In this cash-out system, a monetary amount for which the customer desires cash-out is read from an item tag for cash-out that is brought to a checkout counter by the customer together with an item to be purchased, and cash corresponding to a difference between the read amount and the price of the item to be purchased is dispensed from a cash settlement terminal.

CITATION LIST

Patent Literature

[PTL 1] Japanese Patent No. 4210688

SUMMARY OF THE INVENTION

Problems to be Solved by the Invention

In the above-described conventional art, cash-out is possible as long as the inventory quantity in the cash settlement terminal (dispensable cash) is sufficient. Therefore, if even cash necessary for dispensing of change, which is the primary purpose of the terminal, has been used for cash-out, shortage of change occurs, which will impede cash settlements in subsequent transactions.

Under such circumstances, when a system used for cash settlement is made applicable to cash-out, it is an important issue how to prevent cash settlement from being impeded, and realize smooth dispensing of money. This issue occurs not only when cash-out is performed in a store but also when dispensing of money is performed for multiple purposes, such as cash-out at a station ticket machine, and refund for an item in a store.

The present invention has been made to solve the above problems and an object of the present invention is to provide a money dispensing management apparatus, a money dispensing management system, a money dispensing management method, and a money dispensing management program which allow dispensing of money for multiple purposes to be smoothly performed.

Solution to the Problems

To solve the above problems and achieve the above objects, a money dispensing management apparatus according to one aspect of the present invention includes: a memory configured to store inventory quantity information indicating an inventory quantity of money, and first money information that is information regarding money to be reserved for a primary purpose; an acquisition unit configured to acquire second money information indicating money to be used for a secondary purpose; and a control unit configured to determine whether or not the money indicated in the second money information acquired by the acquisition unit can be dispensed, based on the inventory quantity information and the first money information. When it is determined that dispensing of the money indicated in the second money information cannot be performed, the control unit performs notification control to notify that dispensing of the money cannot be performed.

In the above configuration, the money dispensing management apparatus further includes a notification unit configured to output the notification that dispensing of the money cannot be performed, upon receiving the notification control performed by the control unit.

In the above configuration, the memory stores, as the inventory quantity information, a denomination-specific quantity for each denomination of money that is being stored in the apparatus and dispensable from the apparatus. If a denomination-specific quantity of dispensable money will become less than a denomination-specific quantity of money indicated in the first money information when the money indicated in the second money information is dispensed, the control unit determines that dispensing of the money indicated in the second money information cannot be performed.

In the above configuration, the memory stores, as the inventory quantity information, a denomination-specific quantity for each denomination of money that is being stored in the apparatus and dispensable from the apparatus. If a denomination-specific quantity of dispensable money will become less than a denomination-specific quantity for each denomination of money indicated in the first money information when the money indicated in the second money information is dispensed, the control unit sets a limitation on dispensing of money to be performed based on the second money information. After the setting, when the dispensing of money performed based on the second money information has reached the limitation, the control unit determines that dispensing of money indicated in the second money information cannot be performed.

In the above configuration, the control unit further performs notification control to notify information regarding money that is dispensable for the secondary purpose.

In the above configuration, when the inventory quantity information indicates that there is a denomination of which a storage quantity exceeds a predetermined storage quantity, the control unit further performs notification control to promote dispensing of money of the denomination for the secondary purpose.

In the above configuration, the control unit further performs notification control to promote dispensing of money of a predetermined denomination for the secondary purpose.

In the above configuration, the primary purpose is dispensing money as change, and the secondary purpose is deducting an amount of money from an account balance of a user and dispensing money corresponding to the deducted amount.

In the above configuration, when it is determined that dispensing of the money indicated in the second money information cannot be performed, the control unit changes the denomination and/or the quantity of the money so as to be within a dispensable range, and thereafter performs dispensing of the money.

The present invention includes: a memory configured to store inventory quantity information indicating an inventory quantity of money, and first money information that is information regarding money to be reserved for a primary purpose; an acquisition unit configured to acquire second money information indicating money to be used for a secondary purpose; and a control unit configured to determine whether or not the money indicated in the second money information acquired by the acquisition unit can be dispensed, based on the inventory quantity information and the first money information. When it is determined that dispensing of the money indicated in the second money information cannot be performed, the control unit performs notification control to notify that dispensing of the money cannot be performed.

A money dispensing management method according to one aspect of the present invention includes: storing inventory quantity information indicating an inventory quantity of money and first money information that is information regarding money to be reserved for a primary purpose, in a predetermined memory to manage the information; acquiring second money information indicating money to be used for a secondary purpose; determining whether or not the money indicated in the second money information acquired at the acquiring can be dispensed, based on the inventory quantity information and the first money information; and performing notification control to notify that dispensing of the money cannot be performed when it is determined at the determining that dispensing of the money indicated in the second money information cannot be performed.

The present invention causes a computer to execute: an information management procedure of storing inventory quantity information indicating an inventory quantity of money and first money information that is information regarding money to be reserved for a primary purpose, in a predetermined memory to manage the information; an acquisition procedure of acquiring second money information indicating money to be used for a secondary purpose; a determination procedure of determining whether or not the money indicated in the second money information acquired through the acquisition procedure can be dispensed, based on the inventory quantity information and the first money information; and a notification control procedure of, when it is determined in the determination procedure that dispensing of the money indicated in the second money information cannot be performed, performing notification control to notify that dispensing of the money cannot be performed.

Advantageous Effects of the Invention

According to the present invention, dispensing of money for multiple purposes can be smoothly performed.

BRIEF DESCRIPTION OF THE DRAWINGS

FIG. 9 illustrates an example of display on the change machine.

DESCRIPTION OF EMBODIMENTS

Embodiment

Hereinafter, preferable examples of a money dispensing management apparatus, a money dispensing management system, a money dispensing management method, and a money dispensing management program according to the present embodiment will be described with reference to the drawings. The present embodiment represents a case where the present invention is applied to a money dispensing management system installed in a store such as a convenience store or a supermarket.

<Concept of Money Dispensing Management System According to Present Invention>

Figure 1:
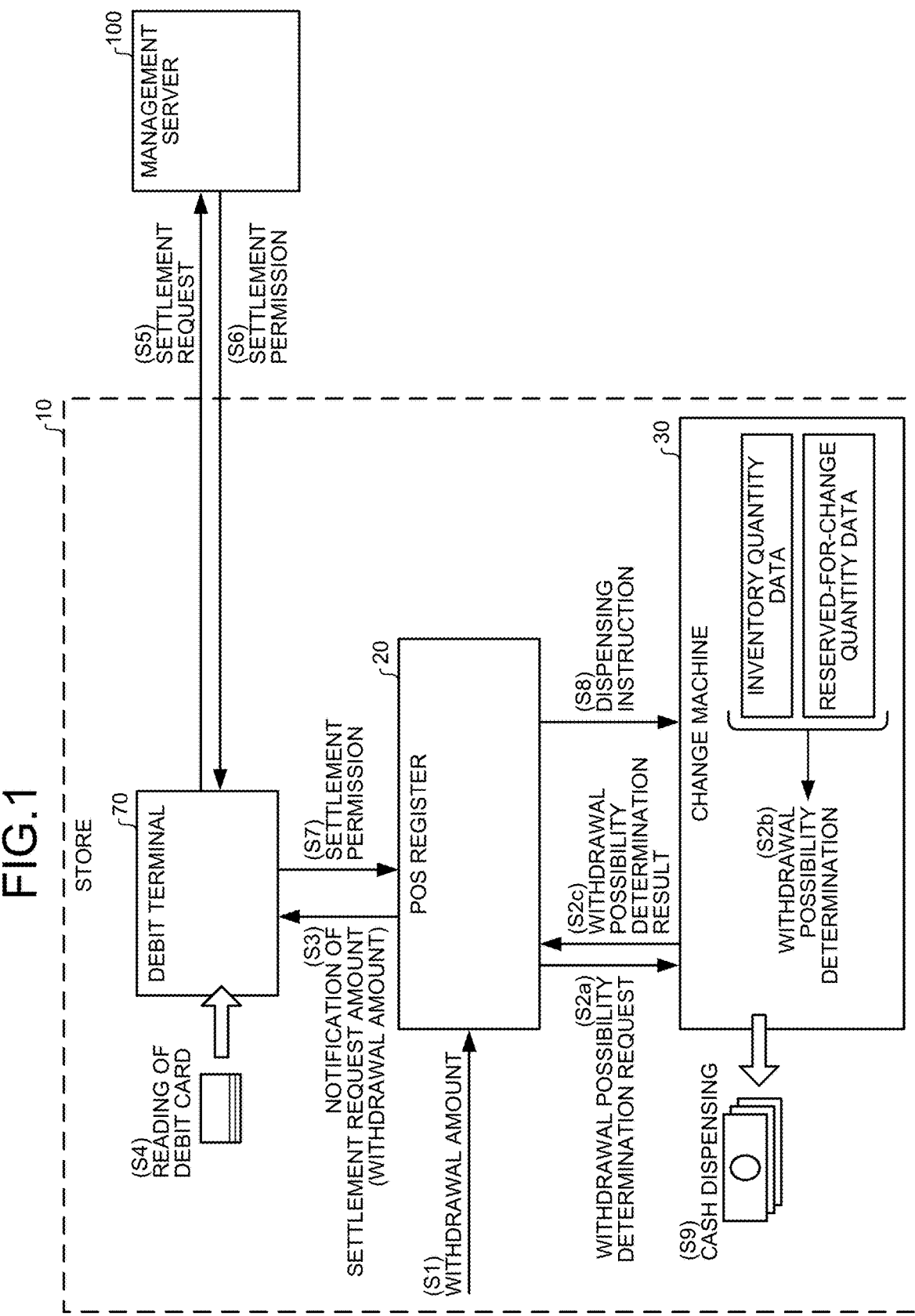
FIG. 1 illustrates the concept of a money dispensing management system according to an embodiment of the present invention.

FIG. 1 illustrates the concept of the money dispensing management system according to the present embodiment. A POS register 20 which is a cash register having a point-of-sales function, and a change machine 30 connected to the POS register are installed in a store such as a convenience store or a supermarket. The change machine 30 stores cash that a store clerk has received from a customer, and dispenses change according to the stored cash.

The POS register 20 executes a process for a transaction in which the customer purchases items. Specifically, first, the POS register 20 receives input of data of items to be purchased by the customer, and calculates a purchase amount that is the total of prices of the items. Meanwhile, the change machine 30 receives money that the clerk has received from the customer and inserted into the machine 30, and notifies the POS register 20 of the total amount of the money as an inserted money mount. When the inserted money amount exceeds the purchase amount, the POS register 20 causes the change machine 30 to dispense change.

In the configuration shown in FIG. 1, a debit terminal 70 is installed in addition to the POS register 20 and the change machine 30. The debit terminal 70 is connected to the POS register 20 and to a management server 100 outside the store 10, and executes handling related to debit settlement.

The debit settlement is a settlement performed by withdrawing a settlement amount from an account of a financial institution or the like by using a debit card associated with the account. When the customer purchases an item, the purchase amount is processed as the settlement amount. The money dispensing management system according to the present embodiment enables the debit card to be used not only for purchase of items but also for withdrawing of cash, i.e., cash-out.

Specifically, upon receiving an input of a withdrawal amount to be withdrawn by cash (S1), the POS register 20 transmits a withdrawal possibility determination request including the withdrawal amount to the change machine 30 (S2a). The change machine 30 stores, as inventory quantity data, an inventory quantity that is a quantity of money for each denomination being stored inside the change machine 30. The change machine 30 also stores reserved-for-change quantity data indicating the quantity of money for each denomination to be reserved for change. Upon receiving the withdrawal possibility determination request, the change machine 30 determines whether or not withdrawal is possible, based on the withdrawal amount included in the withdrawal possibility determination request, the inventory quantity data, and the reserved-for-change quantity data (S2b).

Specifically, the change machine 30 determines that dispensing of money cannot be performed, i.e., withdrawal is impossible, when there is a denomination for which the inventory quantity will become less than the reserved-for-change quantity if money for the withdrawal amount is dispensed. On the other hand, when the inventory quantities of all denominations will be not less than the reserved-for-change quantity even if money for the withdrawal amount is dispensed, the change machine 30 determines that dispensing of the money is possible, that is, withdrawal is possible. After the withdrawal possibility determination, the change machine 30 transmits the result of the determination to the POS register 20 (S2c).

Upon receiving, from the change machine 30, the determination result that withdrawal is impossible, the POS register 20 makes a notification that dispensing of money cannot be performed. For example, this notification may be performed by displaying information on a display of the POS register 20 or the change machine 30 through display control of the display unit. The POS register 20 may not cause the change machine 30 to perform the display control, and the change machine 30 may make the notification that dispensing of money cannot be performed, upon determining that withdrawal is impossible, and may notify the POS register 20 that the withdrawal is impossible.

Meanwhile, upon receiving, from the change machine 30, the determination result that withdrawal is possible, the POS register 20 notifies the debit terminal 70 of the withdrawal amount as a settlement request amount (S3). Upon receiving the notification of the settlement request amount from the POS register 20, the debit terminal 70 reads identification information from the debit card presented by the customer as a user (S4), and transmits a settlement request including the identification information of the debit card and the settlement request amount to the management server 100 (S5).

Upon receiving the settlement request from the debit terminal 70, the management server 100 determines whether or not withdrawal of the settlement request amount from an account associated with the identification information of the debit card is possible. When withdrawal of the settlement request amount is possible, the management server 100 withdraws the settlement request amount from the account as the settlement amount, and transmits a settlement permission to the debit terminal 70 (S6).

The debit terminal 70 notifies the POS register 20 of the settlement permission received from the management server 100 (S7). Upon receiving the settlement permission from the debit terminal 70, the POS register 20 transmits, to the change machine 30, an instruction to dispense money for the withdrawal amount (S8). Upon receiving the dispensing instruction from the POS register 20, the change machine 30 dispenses cash for the withdrawal amount (S9).

As described above, in the money dispensing management system according to the present embodiment, the change machine 30 stores the inventory quantity data indicating the inventory quantity of money, and also stores, as the reserved-for-change quantity data, the quantity of money to be reserved for change which is the primary purpose. When the POS register 20 has received the withdrawal amount for cash-out which is the secondary purpose, the change machine 30 determines whether or not dispensing of money for the withdrawal amount is possible, based on the inventory quantity data and the reserved-for-change quantity data. Upon determining that dispensing of money for the withdrawal amount cannot be performed, the change machine 30 makes a notification to that effect. Therefore, it is possible to avoid a situation where shortage of money for change occurs due to cash-out and thereby cash settlements in subsequent transactions are impeded. Consequently, smooth dispensing of money is realized.

As for reception of the withdrawal amount, the clerk who is an operator of the POS register 20 may input the withdrawal amount. However, it is preferable that cards including codes indicating different withdrawal amounts are disposed at a checkout counter, and the clerk performs an operation to read a code of a card designated by the customer.

In FIG. 1, when there is a denomination for which the inventory quantity will become less than the reserved-for-change quantity if money for the withdrawal amount is dispensed, it is determined that dispensing of money cannot be performed, that is, withdrawal is impossible. However, the present embodiment is not limited thereto. When there is a denomination for which the inventory quantity will become less than the reserved-for-change quantity if money for the withdrawal amount is dispensed, a limitation may be set on withdrawal, instead of immediately determining that withdrawal is impossible. For example, when a limitation is set on the number of times of withdrawal, it is possible to perform only the set number of times (e.g., one time) of withdrawal even after being in a situation where there is a denomination for which the inventory quantity will become less than the reserved-for-change quantity after performing the withdrawal. In this case, after the number of withdrawal has reached the set number of times, it is determined that withdrawal is impossible.

Using the above configuration, the clerk can previously know the time when determination that withdrawal is impossible will be made, and therefore can inform the customer that withdrawal is impossible before the customer starts processing related to withdrawal. The limitation setting and the withdrawal execution state after the limitation setting are preferably notified through the POS register 20 or the like.

<Structures of Apparatuses>

Figure 2:
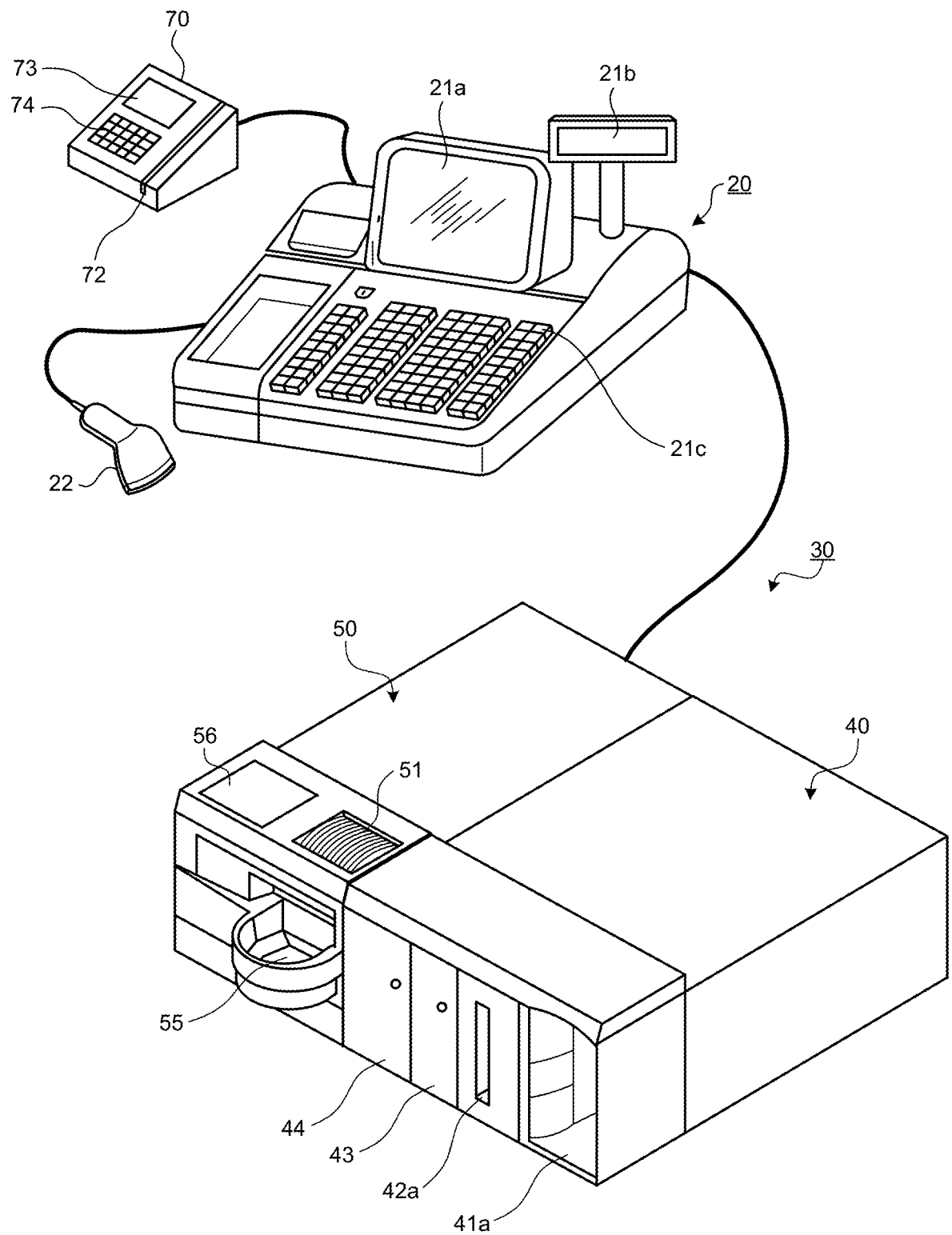
FIG. 2 shows the external structures of a POS register, a change machine, and a debit terminal.

Next, the structures of the respective apparatuses will be described. FIG. 2 shows external structures of the POS register 20, the change machine 30, and the debit terminal 70. As shown in FIG. 2, the POS register 20 includes a display unit 21a for an operator, a display unit 21b for a customer, an operation unit 21c such as an operation key, and a barcode reader 22. The debit terminal 70 includes a card reader 72, a display unit 73, and an operation unit 74.

The change machine 30 includes a banknote handling unit 40, and a coin handling unit 50 that is aligned with and adjacent to the banknote handling unit 40. The POS register 20 can be disposed on the banknote handling unit 40 and the coin handling unit 50.

The banknote handling unit 40 performs depositing and dispensing of banknotes, and has a banknote inlet 41a and a banknote outlet 42a. The banknote handling unit 40 includes a dispensing reject unit 43 and a cassette mounting unit 44 described later.

The coin handling unit 50 performs depositing and dispensing of coins, and has a coin inlet 51 and a coin outlet 55. The coin handling unit 50 further includes a display/operation unit 56 of the change machine 30.

Figure 3:
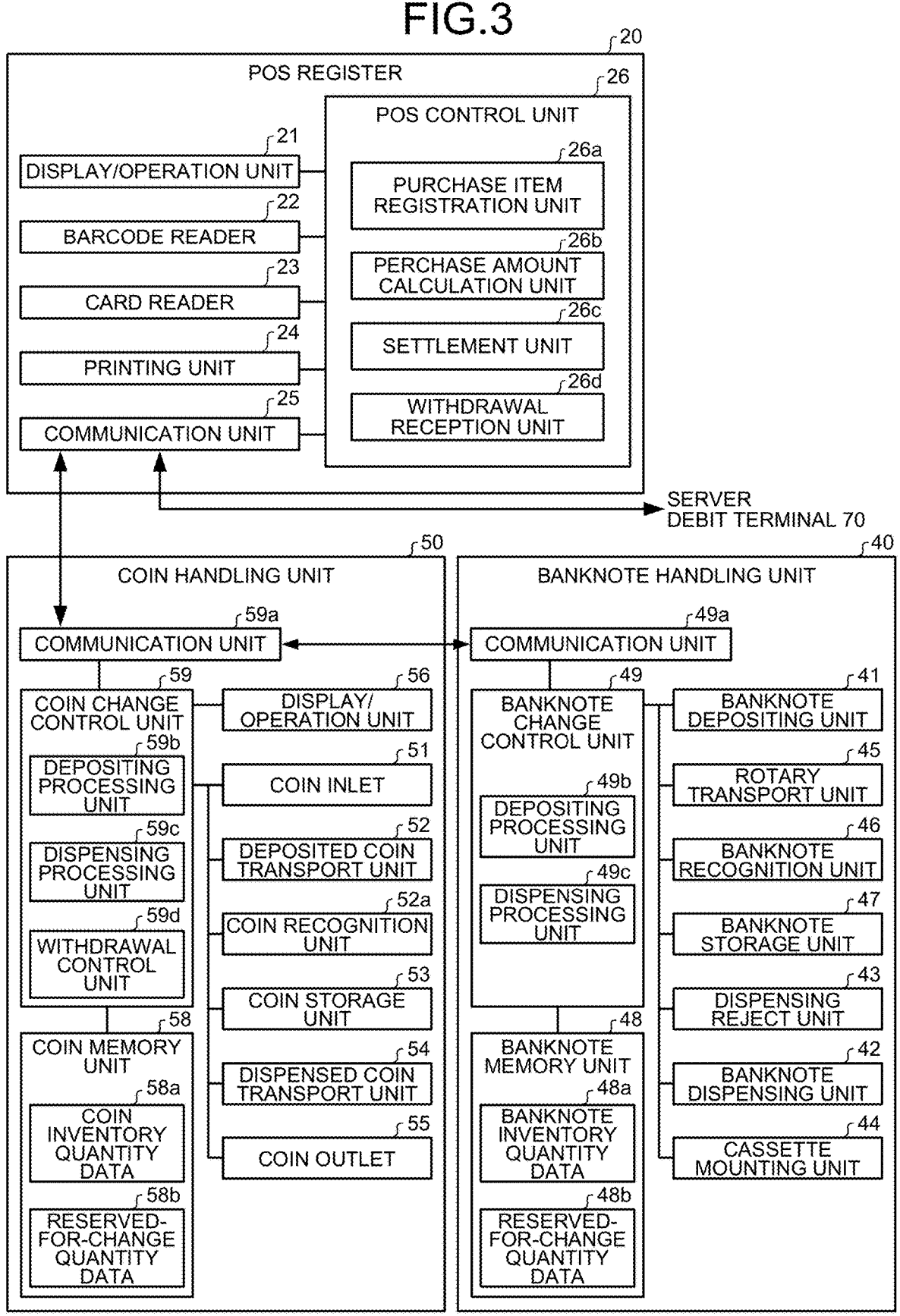
FIG. 3 is a functional block diagram showing functional structures of the POS register and the change machine.

FIG. 3 is a functional block diagram showing functional structures of the POS register 20 and the change machine 30. As shown in FIG. 3, the POS register 20 includes a display/operation unit 21, the barcode reader 22, a card reader 23, a printing unit 24, a communication unit 25, and a POS control unit 26.

The display/operation unit 21 outputs information to the operator and the customer and receives an input from the operator by using the display unit 21a, the display unit 21b, and the operation unit 21c. The barcode reader 22 can acquire information such as the name and price of an item by reading a barcode attached to the item. The barcode reader 22 is also used for reading a card for cash-out to acquire a withdrawal amount indicated on the card for cash-out. The card reader 23 is used for checkout with payment cards such as a credit card and a prepaid card. The debit terminal 70 is used for a debit card among the payment cards.

The printing unit 24 is used for issuing a receipt on which the content of transaction is printed. The content of transaction printed on the receipt includes, for example, the date and time, the names and prices of registered items, the amount of inserted money, the amount of change, etc. The communication unit 25 is a communication interface for communication with the change machine 30, the debit terminal 70, an external server, etc.

The POS control unit 26 controls the entire POS register 20, and includes a purchase item registration unit 26a, a purchase amount calculation unit 26b, a settlement unit 26c, and a withdrawal reception unit 26d. In actuality, programs corresponding to these functional units are stored in a ROM or a nonvolatile memory which are not shown, and the programs are loaded to a CPU (Central Processing Unit) and executed, thereby causing the CPU to execute processes corresponding to the purchase item registration unit 26a, the purchase amount calculation unit 26b, the settlement unit 26c, and the withdrawal reception unit 26d.

The purchase item registration unit 26a performs registration of an item to be purchased. Specifically, when the barcode reader 22 reads a barcode attached to an item and acquires information such as the name and price of the item, the purchase item registration unit 26a performs registration of the item by using the acquired information, and displays the registered item on the display unit 21a and the like.

The purchase amount calculation unit 26b sums up the prices of all items registered by the purchase item registration unit 26a to calculate a purchase amount, and displays the purchase amount on the display unit 21a and the like.

The settlement unit 26c settles the purchase amount calculated by the purchase amount calculation unit 26b to complete the transaction, and issues a receipt. The purchase amount may be settled by using a payment card or by cash.

Specifically, when settlement using a payment card is selected, the settlement unit 26c acquires information such as a card ID from the payment card inserted in the card reader 23, and transmits the information together with the purchase amount to the external server, thereby performing the settlement. When performing a debit settlement, the settlement unit 26c notifies the debit terminal 70 of the purchase amount as a settlement request amount, thereby performing the settlement.

When settlement by cash is selected, the settlement unit 26c transmits the purchase amount to the change machine 30, receives the total amount of money received by the change machine 30, and transmits, to the change machine 30, an instruction to dispense money for change according to need, thereby completing the settlement.

When the barcode reader 22 acquires the withdrawal amount from a code of the card for cash-out, the withdrawal reception unit 26d transmits a withdrawal possibility determination request including the withdrawal amount to the change machine 30. Upon receiving, from the change machine 30, a determination result that withdrawal is impossible, the withdrawal reception unit 26d performs display control of displaying, on the display/operation unit 21, that dispensing of money cannot be performed, thereby making a notification to that effect. Alternatively, an instruction of display control may be transmitted to the change machine 30 to cause the change machine 30 to make the notification. When the change machine 30 makes the notification that dispensing of money cannot be performed, the withdrawal reception unit 26d may not make this notification.

When the withdrawal reception unit 26d receives, from the change machine 30, a determination result that withdrawal is possible, the settlement unit 26c notifies the debit terminal 70 of the withdrawal amount as a settlement request amount. Then, upon receiving a settlement permission from the debit terminal 70, the settlement unit 26c transmits, to the change machine 30, an instruction to dispense money for the withdrawal amount.

The change machine 30 is composed of the banknote handling unit 40 and the coin handling unit 50. The banknote handling unit 40 stores therein banknotes for each denomination. The coin handling unit 50 stores therein coins for each denomination.

The banknote handling unit 40 includes a communication unit 49a, a banknote depositing unit 41, a rotary transport unit 45, a banknote recognition unit 46, a banknote storage unit 47, a dispensing reject unit 43, a banknote dispensing unit 42, a cassette mounting unit 44, a banknote memory unit 48, and a banknote change control unit 49. The communication unit 49a is an interface for data communication with the coin handling unit 50 via a communication line. The banknote handling unit 40 is not directly connected to the POS register 20 by a communication line, but can communicate with the POS register 20 via the coin handling unit 50.

The banknote memory unit 48 is a memory device implemented by, for example, a nonvolatile memory such as a flash memory, or a secondary storage medium such as a hard disk drive. The banknote memory unit 48 stores banknote inventory quantity data 48a and reserved-for-change quantity data 48b.

The banknote inventory quantity data 48a indicates a storage inventory quantity that is the quantity of banknotes for each denomination being stored in the banknote handling unit 40, and a dispensable inventory quantity that is the quantity of dispensable banknotes for each denomination. For example, when abnormal transport or the like occurs, banknotes concerning the abnormal transport are included in the storage inventory quantity but are not included in the dispensable inventory quantity. Specifically, when the storage inventory quantity of 10,000-JPY notes is 100, if three times of overlapping of two banknotes have occurred, the dispensable inventory quantity becomes "100−2×3=94". Also, the dispensable inventory quantity does not include a quantity of banknotes that have not been recognized due to recognition error, and a quantity of banknotes that have been stored in an area, where the stored banknote cannot be fed out therefrom, because a capacity of a storage unit or the like to store the banknotes was full.

The reserved-for-change quantity data 48b indicates, as a reserved-for-change quantity, the number of banknotes for each denomination to be reserved for change. The reserved-for-change quantity can be arbitrarily set, and may be individually set for each denomination. A value of near-empty, which is a threshold value for comparing with a quantity of banknotes being stored therein and urging replenishment of banknotes for change based on comparison result, may be used as the reserved-for-change quantity.

The banknote change control unit 49 controls the banknote handling unit 40, and includes a depositing processing unit 49b and a dispensing processing unit 49c.

The depositing processing unit 49b is a processing unit to perform depositing of banknotes. The depositing processing unit 49b allows insertion of banknotes into the banknote handling unit 40 when receiving the purchase amount from the POS register 20.

Thereafter, the depositing processing unit 49b acquires the number of banknotes, for each denomination, inserted into the banknote handling unit 40, calculates the total amount of the inserted banknotes, and notifies the POS register 20 via the communication unit 59a of the coin handling unit 50.

The dispensing processing unit 49c is a processing unit to perform dispensing of banknotes. Specifically, upon receiving a dispensing instruction from the POS register 20 via the communication unit 59a of the coin handling unit 50, the dispensing processing unit 49c determines denomination and the number of banknotes to be dispensed in accordance with the monetary amount indicated in the dispensing instruction to dispense banknotes. When dispensing of change is successfully completed, the dispensing processing unit 49c notifies the POS register 20 of the completion via the communication unit 59a of the coin handling unit 50.

The coin handling unit 50 includes the communication unit 59a, the coin inlet 51, a deposited coin transport unit 52, a coin recognition unit 52a, a coin storage unit 53, a dispensed coin transport unit 54, a coin outlet 55, a display/operation unit 56, a coin memory unit 58, and a coin change control unit 59. The communication unit 59a is an interface for data communication with the POS register 20 and the banknote handling unit 40 via a communication line.

The coin memory unit 58 is a memory device implemented by, for example, a nonvolatile memory such as a flash memory, or a secondary storage medium such as a hard disk drive. The coin memory unit 58 stores coin inventory quantity data 58a and reserved-for-change quantity data 58b. The coin inventory quantity data 58a indicates a storage inventory quantity that is the quantity of coins for each denomination being stored in the coin handling unit 50, and a dispensable inventory quantity that is the quantity of dispensable coins for each denomination. For example, when abnormal transport or the like occurs, coins concerning the abnormal transport are included in the storage inventory quantity but are not included in the dispensable inventory quantity. The reserved-for-change quantity data 58b indicates, as the reserved-for-change quantity, the number of coins for each denomination to be reserved for change.

The coin change control unit 59 controls the coin handling unit 50, and includes a depositing processing unit 59b, a dispensing processing unit 59c, and a withdrawal control unit 59d.

The depositing processing unit 59b is a processing unit to perform depositing of coins. The depositing processing unit 59b allows insertion of coins into the coin handling unit 50 when receiving the purchase amount from the POS register 20.

Thereafter, the depositing processing unit 59b acquires the number of coins, for each denomination, inserted into the coin handling unit 50, calculates the total amount of the inserted coins, and notifies the POS register 20.

The dispensing processing unit 59c is a processing unit to perform dispensing of coins. Specifically, upon receiving a dispensing instruction from the POS register 20, the dispensing processing unit 59c determines denomination and the number of coins to be dispensed in accordance with the monetary amount indicated in the dispensing instruction to dispense coins. When dispensing is successfully completed, the dispensing processing unit 59c notifies the POS register 20 of the completion.

The withdrawal control unit 59d is a processing unit to perform withdrawal of money. Specifically, upon receiving a withdrawal possibility determination request from the POS register 20, the withdrawal control unit 59d determines whether or not the withdrawal is possible, based on the withdrawal amount indicated in the withdrawal possibility determination request, the inventory quantity data, and the reserved-for-change quantity data. As for the inventory quantity data, the banknote inventory quantity data 48a and the coin inventory quantity data 58a are used according to need. As for the reserved-for-change quantity data, the reserved-for-change quantity data 48b and the reserved-for-change quantity data 58b are used according to need. For example, when it is determined based on a money amount of withdrawal that only banknotes are to be dispensed for the withdrawal, the withdrawal possibility determination is performed based on the banknote inventory quantity data 48a and the reserved-for-change quantity data 48b.

In the withdrawal possibility determination, the withdrawal control unit 59d determines that dispensing of money cannot be performed, that is, withdrawal is impossible, when there is a denomination, for which the dispensable inventory quantity will become less than the reserved-for-change quantity if money for the withdrawal amount is dispensed. Meanwhile, if each of the dispensable inventory quantities of all denominations will not be less than the corresponding reserved-for-change quantity even if money for the withdrawal amount is dispensed, the withdrawal control unit 59d determines that dispensing of money is possible, that is, withdrawal is possible.

The withdrawal control unit 59d transmits the result of the withdrawal possibility determination to the POS register 20. When determining that withdrawal is impossible, the withdrawal control unit 59d transmits the result of the withdrawal possibility determination to the POS register 20, and may make a notification by causing the display/operation unit 66 to display that dispensing of money cannot be performed.

When the determination result is that withdrawal for the withdrawal amount indicated by the withdrawal possibility determination request is impossible, it is possible to propose to change the withdrawal amount or the monetary composition to the customer. For example, when only four 10,000-JPY notes can be dispensed although the customer requests withdrawal of 50,000-JPY, a proposal to change the withdrawal amount by a message like "you can withdraw 40,000-JPY", or to change the monetary composition by a message like "you can withdraw four 10,000-JPY notes and ten 1,000-JPY notes", may be presented to the customer.

When the above configuration is used, first, the withdrawal control unit 59d obtains a withdrawable amount and monetary composition, based on the dispensable inventory quantity and the reserved-for-change quantity, and notifies the POS register 20 of the amount and composition. Upon receiving the notification, the POS register 20 notifies the clerk and the customer of the withdrawable amount and monetary composition. Upon receiving an operation of approval of the customer, the POS register 20 executes a debit settlement based on the changed amount or monetary combination, and causes money to be dispensed.

The withdrawal control unit 59d can perform display control of displaying, on the display/operation unit 56, a difference between the dispensable inventory quantity and the reserved-for-change quantity, as the quantity of withdrawable money, i.e., the quantity of money available for cash-out. The display of the quantity of money available for cash-out may be performed constantly or only when a predetermined operation is received.

The withdrawal control unit 59d can perform determination and notification related to promotion of withdrawal. In the change machine 30, money is stored for each denomination. If the storage quantity of any denomination of the money has reached an upper limit of the capacity of the corresponding storage unit, this may adversely affect settlement of item purchase and therefore, it is requested to stop use of the change machine 30 and perform collection of the corresponding money.

Therefore, withdrawal is promoted for money whose storage quantity is close to the upper limit so as to reduce the storage quantity of money by performing the withdrawal, whereby the number of money collection works is reduced, and efficiency in operating the change machine 30 is improved.

Specifically, the withdrawal control unit 59d compares the storage inventory quantity with a promotion determination threshold to determine whether or not to promote withdrawal. The promotion determination threshold can be arbitrarily set, and may be individually set for each denomination. Alternatively, a value of near-full, which is a threshold value for comparing with a quantity of money being stored therein and urging collection of money therefrom, may be used as the promotion determination threshold. When the determination result indicates that there is a denomination for which the storage inventory quantity is not less than the promotion determination threshold, the withdrawal control unit 59d performs display control of displaying, on the display/operation unit 56, cash-out promotion that promotes withdrawal of the corresponding denomination.

Determination related to promotion of withdrawal can be selectively performed for a specific denomination. For example, since 10,000-JPY notes, which are money of the highest denomination, are not dispensed as change, determination and notification related to promotion of withdrawal may be performed for only 10,000-JPY notes.

Figure 4:
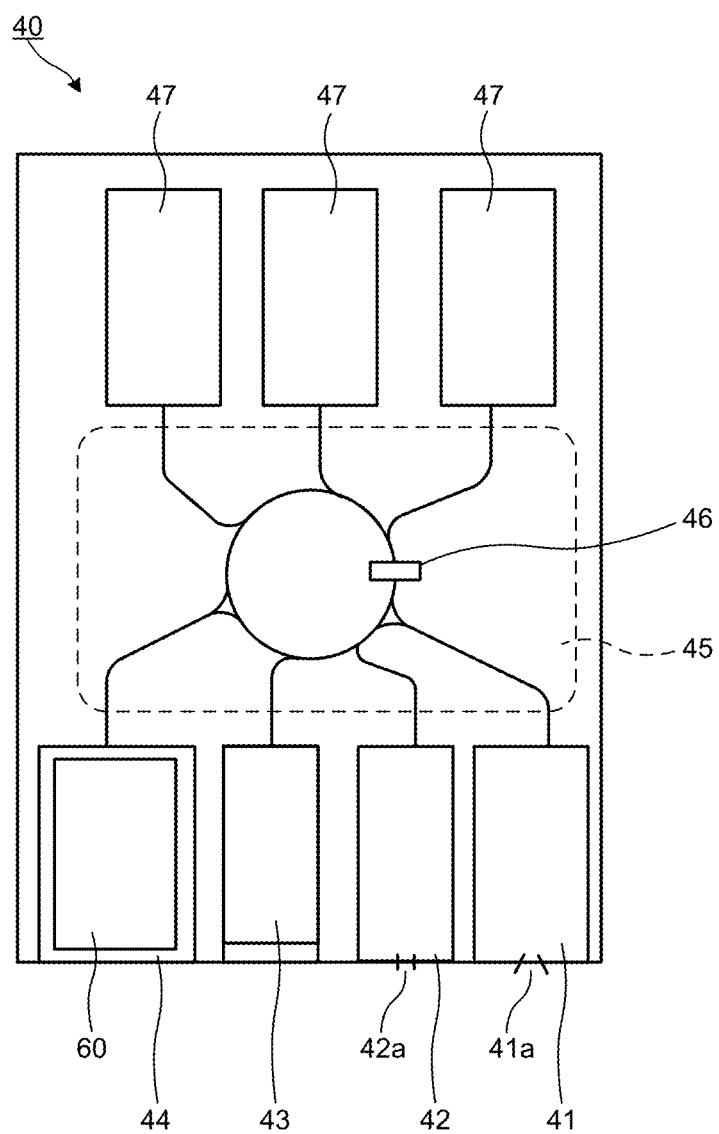
FIG. 4 shows the structure of a banknote handling unit.

Next, the banknote handling unit 40 and the coin handling unit 50 will be described in detail. FIG. 4 shows the structure of the banknote handling unit 40. As shown in FIG. 4, the banknote handling unit 40 includes the banknote depositing unit 41, the banknote dispensing unit 42, the dispensing reject unit 43, the cassette mounting unit 44, the rotary transport unit 45, the banknote recognition unit 46, and banknote storage units 47 by denominations.

The banknote depositing unit 41 receives banknotes inserted into the banknote inlet 41a, and feeds out the received banknotes one by one to the rotary transport unit 45. The banknote dispensing unit 42 temporarily stores the banknotes transported one by one from the rotary transport unit 45. When all banknotes to be dispensed have been stored, the banknote dispensing unit 42 discharges the banknotes from the banknote outlet 42a, thereby dispensing the banknotes.

The dispensing reject unit 43 accumulates therein banknotes that are not to be dispensed, such as a banknote whose denomination cannot be recognized. For example, among banknotes having been fed out from the banknote storage units 47 during dispensing, a banknote, which could not be recognized by the banknote recognition unit 46 because of abnormal transport such as overlapping or skew, is transported to the dispensing reject unit 43. Meanwhile, among banknotes having been taken into the machine from the banknote depositing unit 41 during depositing, a banknote, which could not be recognized by the banknote recognition unit 46 because of stain or the like, is returned as a deposit rejected banknote to the banknote dispensing unit 42.

A banknote cassette 60, which is used for collection of proceeds from sales and replenishment of change, is detachably mounted to the cassette mounting unit 44.

The plurality of banknote storage units 47 are assigned corresponding denominations. Each banknote storage unit 47 stores therein banknotes of the assigned denomination, and feeds out the stored banknotes one by one.

The rotary transport unit 45 includes a rotary transport path in the center of the unit. A connection/transport path is disposed between the rotary transport path and each of the banknote depositing unit 41, the banknote dispensing unit 42, the dispensing reject unit 43, the cassette mounting unit 44, and the plurality of banknote storage units 47. The rotary transport path is provided with the banknote recognition unit 46 which recognizes, for example, the denomination, authenticity, fitness, face/back orientation, and transport state of each banknote.

The rotary transport unit 45 drives the rotary transport path to rotate in both the clockwise direction and the counterclockwise direction in FIG. 4 and transports the banknotes one by one. Specifically, when storing the banknotes in the banknote storage unit 47, the rotary transport path is driven to rotate clockwise in FIG. 4. When feeding out the banknotes from the banknote storage unit 47, the rotary transport path is driven to rotate counterclockwise in FIG. 4. In addition to the rotation drive control, the rotary transport unit 45 controls the destination of the banknotes by switching the banknote transport routes between the rotary transport path and the respective connection/transport paths.

Figure 5:
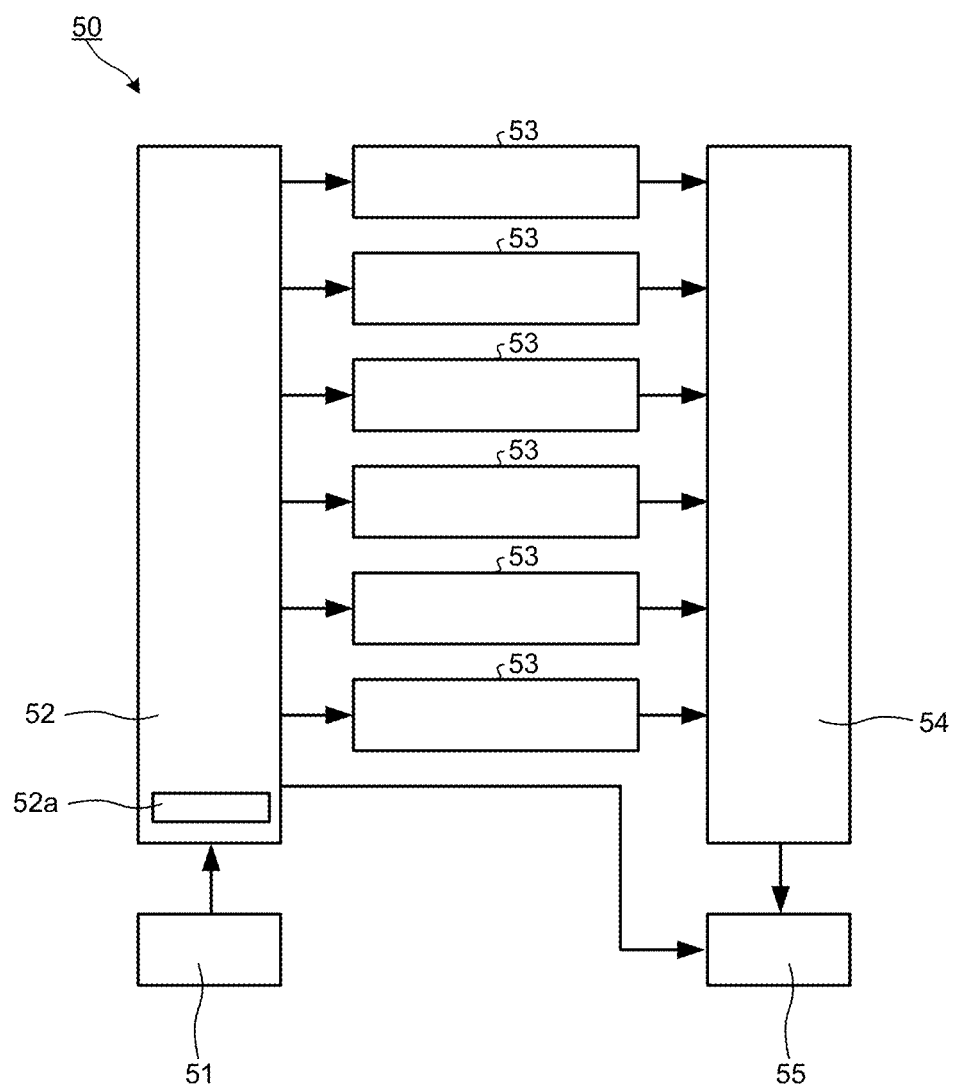
FIG. 5 shows the structure of a coin handling unit.

FIG. 5 shows the structure of the coin handling unit 50. As shown in FIG. 5, the coin handling unit 50 includes the coin inlet 51, the deposited coin transport unit 52, the coin storage units 53 by denominations, the dispensed coin transport unit 54, and the coin outlet 55. The deposited coin transport unit 52 is provided with the coin recognition unit 52a.

The deposited coin transport unit 52 takes coins inserted in the coin inlet 51 one by one into the housing of the coin handling unit 50 such that the coins are arranged in one layer in one line. Specifically, the deposited coin transport unit 52 is provided with a coin feeding mechanism including a feed belt, etc. When insertion of coins into the coin inlet 51 is detected, the coin feeding mechanism is driven, and the coins are fed out one by one.

The coin recognition unit 52a recognizes, for example, the denomination, authenticity, fitness, face/back orientation, and transport state of each of the coins fed by the deposited coin transport unit 52. The deposited coin transport unit 52 determines the destination of each coin, based on the recognition result of the coin recognition unit 52a. At this time, a coin not to be stored in the coin storage unit 53, such as a stained coin or a coin not recognized as a genuine coin, is transported to the coin outlet 55 as a rejected coin. A coin to be stored in the coin storage unit 53 is transported to the coin storage unit 53 corresponding to the recognition result of the denomination.

The plurality of coin storage units 53 are assigned corresponding denominations. Each coin storage unit 53 stores therein coins of the assigned denomination, and feeds out the stored coins one by one to the dispensed coin transport unit 54. The dispensed coin transport unit 54 transports the coins fed out from the coin storage unit 53, and discharges the coins to the coin outlet 55.

Figure 6:
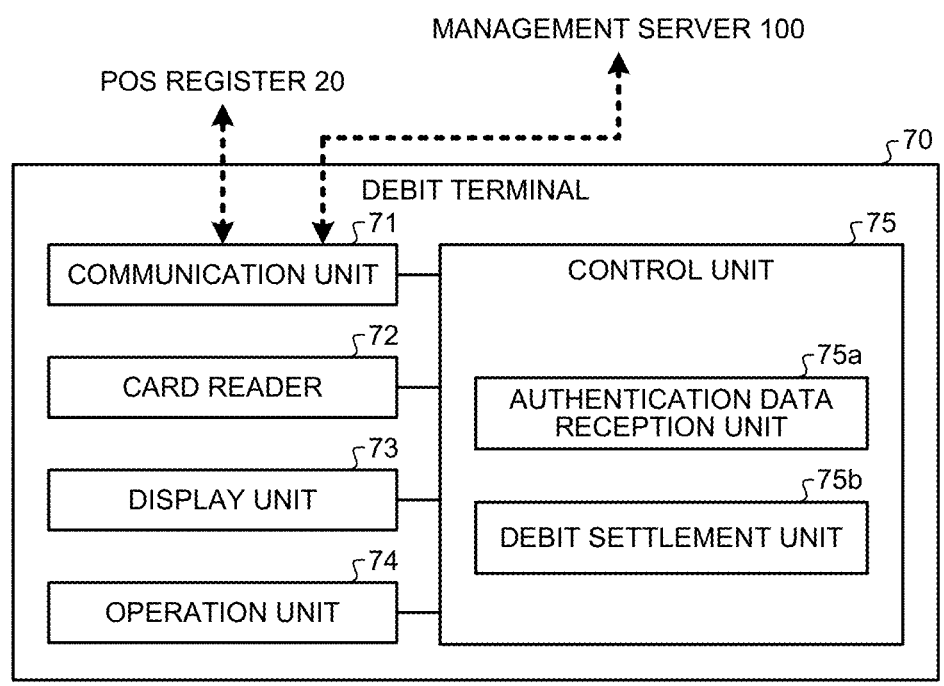
FIG. 6 is a functional block diagram showing the functional structure of a debit terminal.

FIG. 6 is a functional block diagram showing the functional structure of the debit terminal 70. As shown in FIG. 6, the debit terminal 70 includes a communication unit 71, a card reader 72, a display unit 73, an operation unit 74, and a control unit 75. The communication unit 71 is a communication interface for communication with the POS register 20 and the management server 100.

The card reader 72 is used for reading identification information from a debit card. The display unit 73 is used for displaying, for example, the operation state of the debit terminal 70. The operation unit 74 is used for inputting a PIN number by a customer, for example.

The control unit 75 controls the entire debit terminal 70, and includes an authentication data reception unit 75a and a debit settlement unit 75b. The authentication data reception unit 75a receives a PIN number or the like inputted through the operation unit 74 as authentication data.

The debit settlement unit 75b transmits, to the management server 100, a settlement request including the settlement request amount notified by the POS register 20, the identification information of the debit card read by the card reader 72, and the authentication data received by the authentication data reception unit 75a. Then, the debit settlement unit 75b notifies the POS register 20 of a settlement result transmitted from the management server 100. The settlement result is either settlement permission indicating that the settlement is possible or settlement non-permission indicating that the settlement of the request is impossible.

<Description of Handling>

Figure 7:
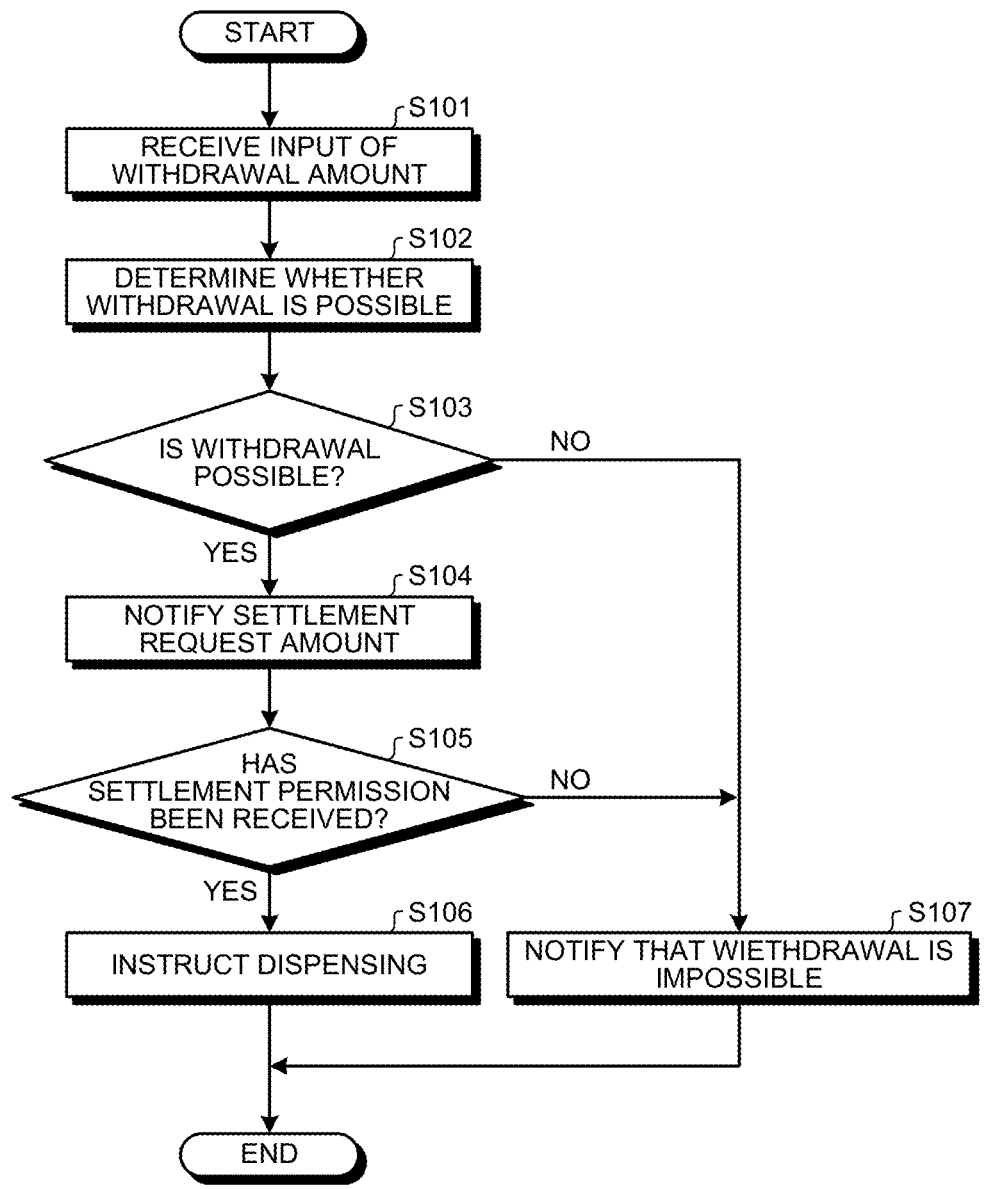
FIG. 7 is a flowchart showing a handling procedure of the POS register related to withdrawal.

Next, a handling procedure of the POS register 20 related to withdrawal will be described with reference to a flowchart shown in FIG. 7. When the withdrawal reception unit 26d of the POS register 20 receives an input of a withdrawal amount (step S101), the withdrawal reception unit 26d transmits a withdrawal possibility determination request including the withdrawal amount to the change machine 30, thereby causing the change machine 30 to perform withdrawal possibility determination (step S102).

When the withdrawal reception unit 26d has received, from the change machine 30, a determination result indicating that withdrawal is impossible (No in step S103), the withdrawal reception unit 26d performs display control of displaying, on the display/operation unit 21, that dispensing of money cannot be performed, thereby notifying that withdrawal is impossible (step S107), and ends the handling for withdrawal.

On the other hand, when the withdrawal reception unit 26d has received, from the change machine 30, a determination result that withdrawal is possible (Yes in step S103), the settlement unit 26c notifies the debit terminal 70 of the withdrawal amount as the settlement request amount (step S104).

Thereafter, when the settlement unit 26c has not received settlement permission but instead has received settlement non-permission from the debit terminal 70 (No in step S105), the settlement unit 26c performs display control of displaying, on the display/operation unit 21, that dispensing of money cannot be performed, thereby notifying that withdrawal is impossible (step S107), and ends the handling for withdrawal.

On the other hand, when the settlement unit 26c has received settlement permission from the debit terminal 70 (Yes in step S105), the settlement unit 26c transmits an instruction to the change machine 30 to dispense the withdrawal amount of money (step S106), and ends the handling for withdrawal.

Figure 8:
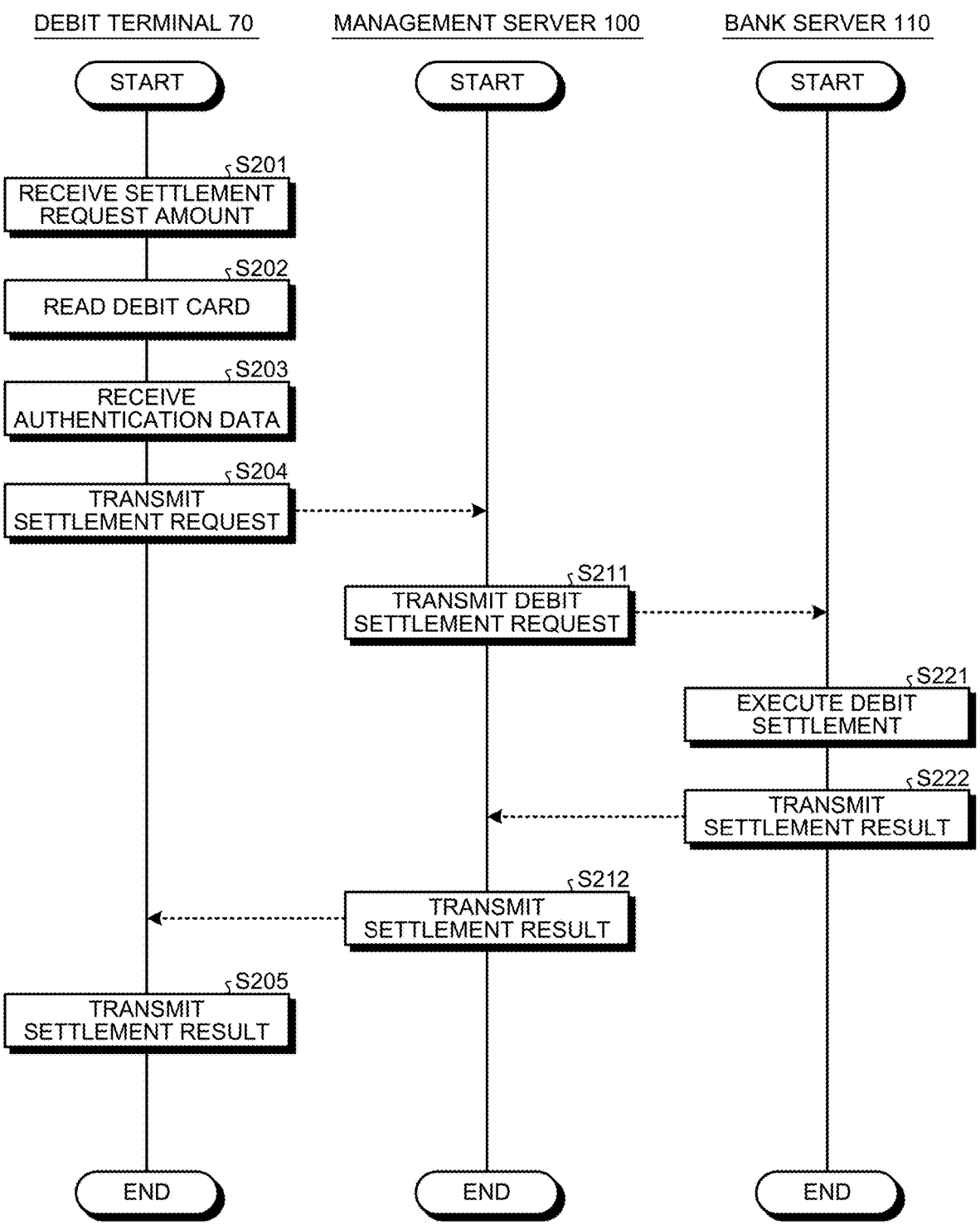
FIG. 8 illustrates a handling procedure related to debit settlement.

In FIG. 8, it is determined that dispensing of money cannot be performed, that is, withdrawal is impossible, when there is a denomination for which the inventory quantity will become less than the reserved-for-change quantity when money for the withdrawal amount is dispensed. However, the present embodiment is not limited thereto. When there is a denomination for which the inventory quantity will become less than the reserved-for-change quantity if money for the withdrawal amount is dispensed, a limitation may be set on withdrawal, instead of immediately determining that withdrawal is impossible. For example, when a limitation is set on the number of times of withdrawal, only a predetermined number of times (e.g., one time) of withdrawal is possible even after it is determined that there is a denomination for which the inventory quantity will become less than the reserved-for-change quantity if withdrawal is performed. In this case, after the number of withdrawal has reached the predetermined number of times, it is determined that withdrawal is impossible.

Using the above handling, the clerk can previously know the time when determination that withdrawal is impossible will be made, and therefore can inform the customer that withdrawal is impossible before the customer starts processing related to withdrawal. The limitation setting and the withdrawal execution state after the limitation setting are preferably notified through the POS register 20 or the like.

Next, a handling procedure related to debit settlement will be described with reference to FIG. 8. First, the debit terminal 70 is notified of the settlement request amount from the POS register 20 (step S201), reads identification information from a debit card (step S202), and receives authentication data (step S203). Then, the debit terminal 70 transmits, to the management server 100, a settlement request including the settlement request amount, the identification information of the debit card, and the authentication data (step S204).

Based on the settlement request received from the debit terminal 70, the management server 100 transmits a debit settlement request to a bank server 110 of a bank that manages member stores (step S211). The bank server 110 receives the debit settlement request and executes a debit settlement (step S221). In this debit settlement, the bank server 110 specifies an account from the identification information of the debit card indicated in the debit settlement request, and performs authentication by using the authentication data indicated in the debit settlement request. When the authentication has succeeded and the balance of the account is not less than the settlement request amount, the bank server 110 determines to permit the settlement. When the authentication has failed or the balance of the account is less than the settlement request amount, the bank server 110 determines not to permit the settlement. The bank server 110 transmits the settlement result to the management server 100 (step S222).

The management server 100 transmits the settlement result received from the bank server 110 to the debit terminal 70 (step S212). The debit terminal 70 transmits the settlement result received from the management server 100 to the POS register 20 (step S205), and ends the handling for withdrawal.

Next, an example of display on the change machine 30 will be described with reference to FIG. 9. FIG. 9 shows a state where the change machine 30 causes the display/operation unit 56 to display the number of banknotes/coins available for cash-out, and cash-out promotion.

Specifically, FIG. 9 shows the state where the number of 10,000-JPY notes available for cash-out is 50, the number of 5,000-JPY notes available for cash-out is 10, the number of 1,000-JPY notes available for cash-out is 60, the number of 500-JPY coins available for cash-out is 20, the number of 100-JPY coins available for cash-out is 120, the number of 50-JPY coins available for cash-out is 50, the number of 10-JPY coins available for cash-out is 35, the number of 5-JPY coins available for cash-out is 20, and the number of 1-JPY coins available for cash-out is 30. In addition, cash-out promotion is displayed to promote withdrawal of 10,000-JPY notes and 1,000-JPY notes.

<Modifications>

In the above description, the change machine 30 performs withdrawal possibility determination. However, withdrawal possibility determination is not necessarily performed by the change machine 30, and may be performed by another device such as the POS register 20.

Figure 10:
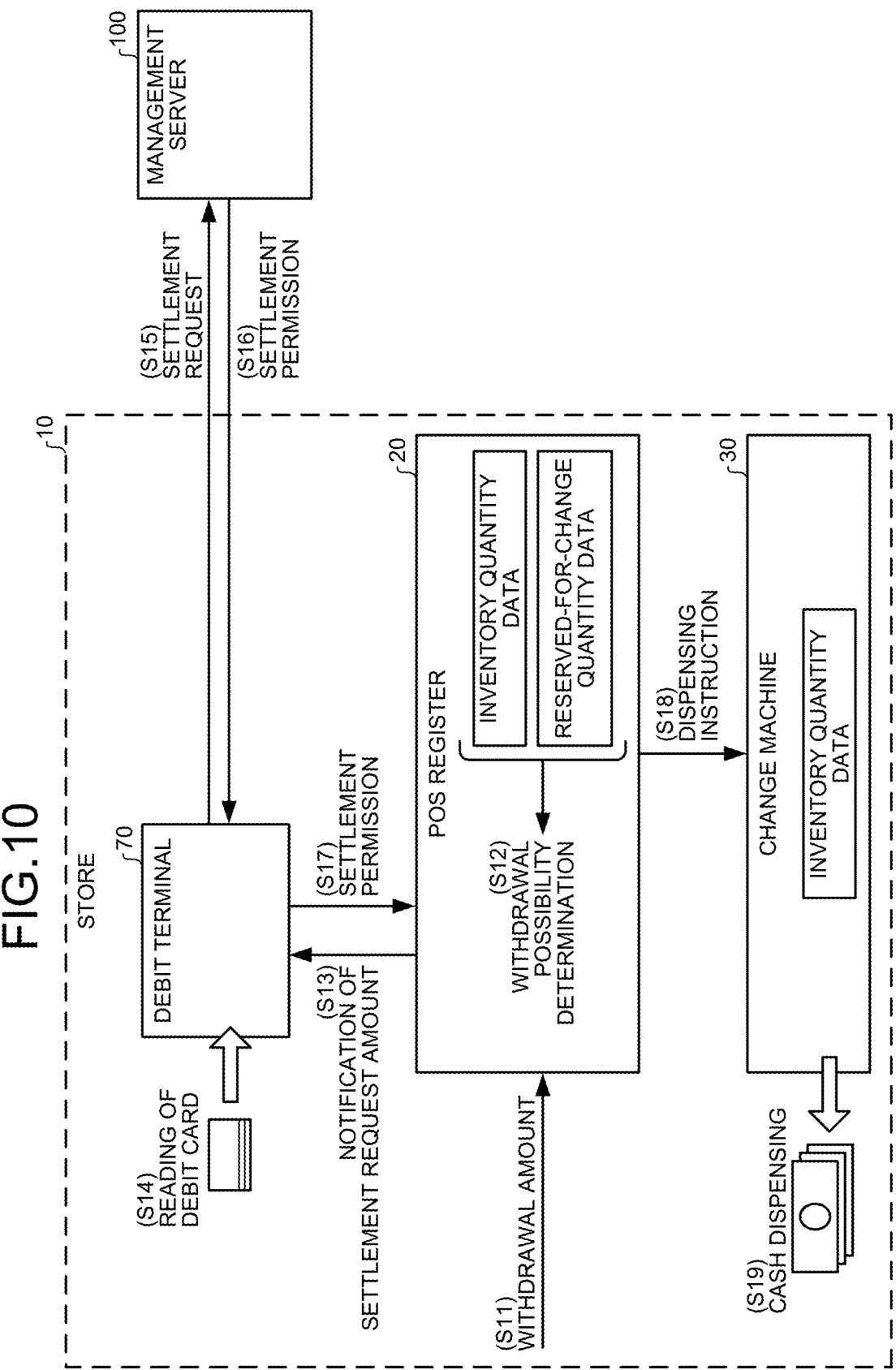
FIG. 10 illustrates a case where the POS register performs withdrawal possibility determination.

FIG. 10 shows a case where the POS register 20 performs withdrawal possibility determination. In the configuration shown in FIG. 10, the change machine 30 stores inventory quantity data regarding itself, while the POS register 20 stores inventory quantity data indicating the inventory quantity of the change machine 30. Additionally, the POS register 20 stores reserved-for-change quantity data in addition to the inventory quantity data of the change machine 30. In this configuration, the change machine 30 need not store the reserved-for-change quantity data.

The operation of the configuration shown in FIG. 10 is as follows. First, the POS register 20 receives an input of a withdrawal amount (S11), and determines whether or not withdrawal is possible, based on the withdrawal amount and on the inventory quantity data and the reserved-for-change quantity data stored therein (S12).

Upon determining that withdrawal is impossible, the POS register 20 makes a notification that dispensing of money cannot be performed. Upon determining that withdrawal is possible, the POS register 20 notifies the debit terminal 70 of the withdrawal amount as a settlement request amount (S13). Upon receiving the notification of the settlement request amount from the POS register 20, the debit terminal 70 reads identification information from a debit card presented by a customer as a user (S14), and transmits a settlement request including the identification information of the debit card and the settlement request amount to the management server 100 (S15).

Upon receiving the settlement request from the debit terminal 70, the management server 100 determines whether or not withdrawal of the settlement request amount from an account associated with the identification information of the debit card is possible. When the withdrawal of the settlement request amount is possible, the management server 100 withdraws the settlement request amount as a settlement amount from the account, and transmits a settlement permission to the debit terminal 70 (S16).

The debit terminal 70 notifies the POS register 20 of the settlement permission received from the management server 100 (S17). Upon receiving the settlement permission from the debit terminal 70, the POS register 20 transmits a dispensing instruction for the withdrawal amount to the change machine 30 (S18). Upon receiving the dispensing instruction from the POS register 20, the change machine 30 dispenses cash for the withdrawal amount (S19).

Figure 11:
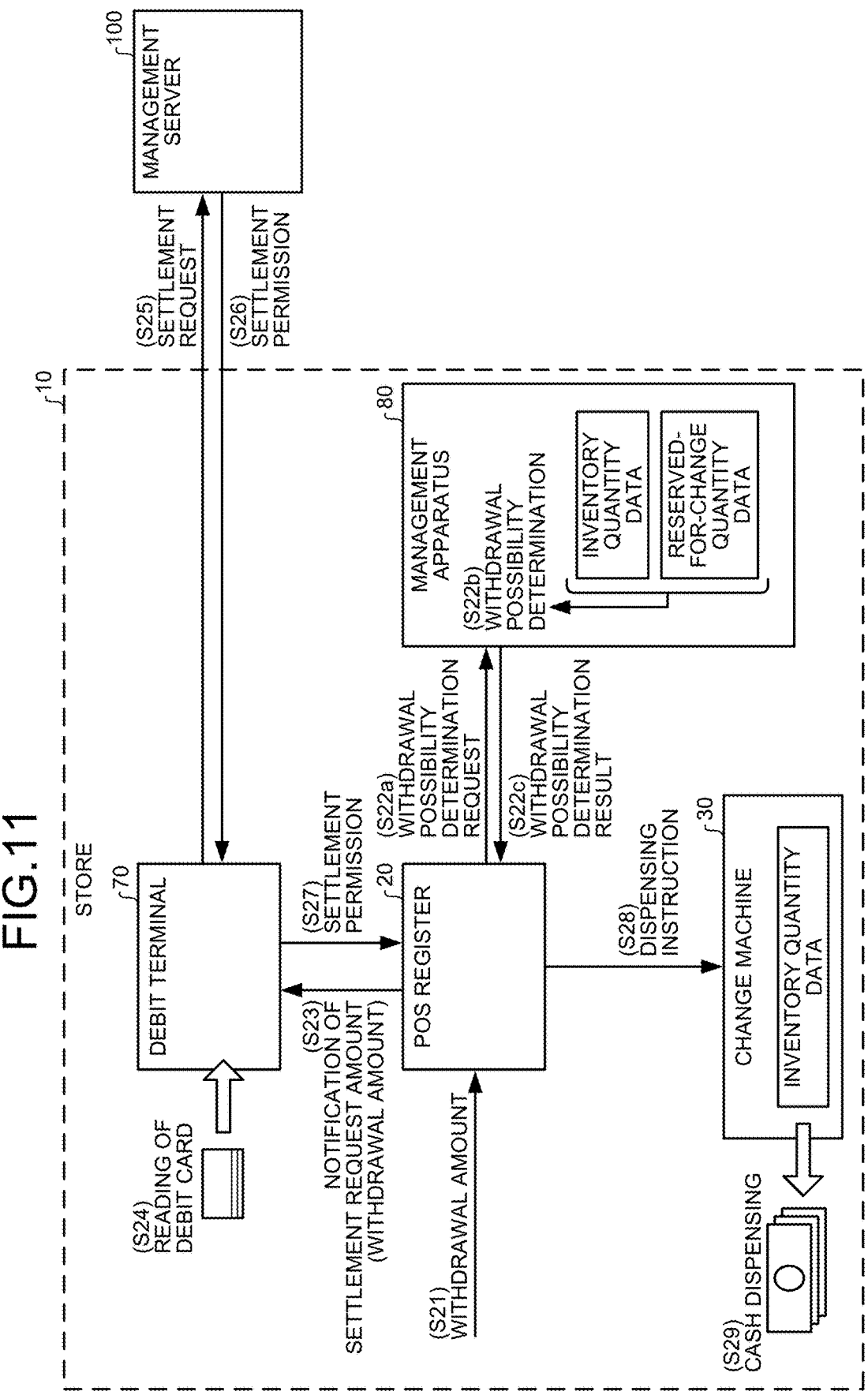
FIG. 11 illustrates a case where a management apparatus installed in a store performs withdrawal possibility determination.

FIG. 11 shows a case where a management apparatus 80 installed in a store 10 performs withdrawal possibility determination. In the configuration shown in FIG. 11, the change machine 30 stores inventory quantity data regarding itself, while the management apparatus 80 stores the inventory quantity data indicating the inventory quantity of the change machine 30. The management apparatus 80 stores reserved-for-change quantity data in addition to the inventory quantity data of the change machine 30. In this configuration, the change machine 30 need not store the reserved-for-change quantity data.

The operation of the configuration shown in FIG. 11 is as follows. First, the POS register 20 receives an input of a withdrawal amount (S21), and transmits a withdrawal possibility determination request including the withdrawal amount to the management apparatus 80 (S22a). The management apparatus 80 performs withdrawal possibility determination, based on the inventory quantity data, the reserved-for-change quantity data, and the withdrawal amount indicated in the withdrawal possibility determination request (S22b), and transmits a result of withdrawal possibility determination to the POS register 20 (S22c).

When receiving from the management apparatus 80 a determination result that withdrawal is impossible, the POS register 20 makes a notification that dispensing of money cannot be performed. On the other hand, when receiving from the management apparatus 80 a determination result that withdrawal is possible, the POS register 20 notifies the debit terminal 70 of the withdrawal amount as a settlement request amount (S23). Upon receiving the notification of the settlement request amount from the POS register 20, the debit terminal 70 reads identification information from a debit card presented by a customer as a user (S24), and transmits a settlement request including the identification information of the debit card and the settlement request amount to the management server 100 (S25).

Upon receiving the settlement request from the debit terminal 70, the management server 100 determines whether or not withdrawal of the settlement request amount from an account associated with the identification information of the debit card is possible. When withdrawal of the settlement request amount is possible, the management server 100 withdraws the settlement request amount as a settlement amount from the account, and transmits settlement permission to the debit terminal 70 (S26).

The debit terminal 70 notifies the POS register 20 of the settlement permission received from the management server 100 (S27). Upon receiving the settlement permission from the debit terminal 70, the POS register 20 transmits a dispensing instruction for the withdrawal amount to the change machine 30 (S28). Upon receiving the dispensing instruction from the POS register 20, the change machine 30 dispenses cash for the withdrawal amount (S29).

Figure 12:
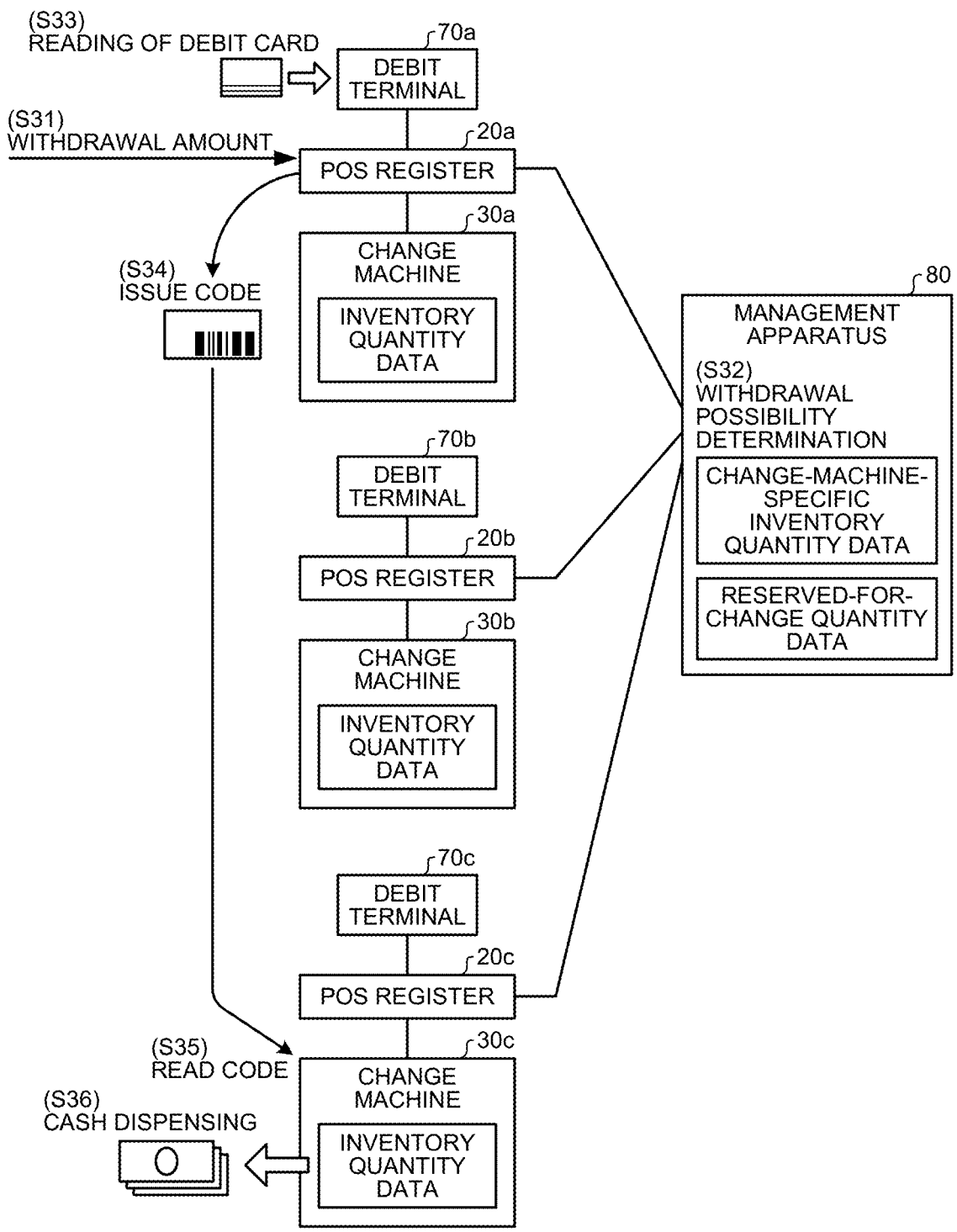
FIG. 12 illustrates a configuration in which a management apparatus manages the inventory quantities of a plurality of change machines.

Next, a configuration in which the management apparatus 80 manages the inventory quantities of a plurality of change machines 30 will be described with reference to FIG. 12. As shown in FIG. 12, when a plurality of POS registers 20 and a plurality of change machines 30 are installed in a store, the management apparatus 80 can individually mange the inventory quantities of the respective change machines 30.

In FIG. 12, three POS registers 20 (POS registers 20a, 20b, and 20c) are installed, and change machines 30 (change machines 30a, 30b, and 30c) and debit terminals 70 (debit terminals 70a, 70b, and 70c) corresponding to the respective POS registers 20 are connected to the POS registers 20.

The POS registers 20a, 20b, and 20c are connected to the management apparatus 80. The management apparatus 80 acquires inventory quantity data of the change machines 30a, 30b, and 30c via the POS registers 20a, 20b, and 20c, respectively, and stores the data as change-machine-specific inventory quantity data. The management apparatus 80 further stores reserved-for-change quantity data. The reserved-for-change quantity data may be shared among the plurality of change machines 30, or each change machine 30 may be provided with reserved-for-change quantity data.

The management apparatus 80 performs withdrawal possibility determination when receiving a withdrawal possibility determination request from any POS register 20. If withdrawal cannot be performed because the inventory quantity of a change machine 30 corresponding to the source of the withdrawal possibility determination request is insufficient, the management apparatus 80 can cause another change machine 30 to perform dispensing.

In FIG. 12, the POS register 20a receives an input of a withdrawal amount (S31) and transmits a withdrawal possibility determination request including the withdrawal amount to the management apparatus 80, and the management apparatus 80 performs withdrawal possibility determination (S32). If dispensing for the withdrawal amount cannot be performed because the inventory quantity of the change machine 30a is insufficient, the management apparatus 80 refers to the inventory quantities of other change machines 30, and determines whether or not there is a change machine 30 that can perform dispensing for the withdrawal amount. In FIG. 12, since dispensing from the change machine 30c is possible, the management apparatus 80 transmits, to the POS register 20a, a determination result that dispensing from the change machine 30c is possible.

Upon receiving the determination result that dispensing from the change machine 30c is possible, the POS register 20a causes the debit terminal 70a to read identification information of a debit card (S33), generates a code for dispensing, and issues the code by using the printing unit 24 (S34). The code for dispensing is generated by encoding the identification information of the debit card and the withdrawal amount. Although a one-dimensional barcode is shown as the code for dispensing in FIG. 12, a two-dimensional barcode may be used, or a character string or the like may be used as a code. Guide information indicating the positions of the change machine 30c and the POS register 20c may be further printed together with the code for dispensing.

Thereafter, when the POS register 20c reads the code for dispensing (S35), the POS register 20c transmits the identification information of the debit card and the withdrawal amount to the debit terminal 70c. The debit terminal 70c communicates with a management server 100 (not shown) and executes a debit settlement. That is, the debit terminal 70c can execute the debit settlement without reading the debit card. Acquisition of authentication data for the debit settlement, i.e., reception of inputted PIN number, is performed by the debit terminal 70c. When this debit settlement is permitted to be done, cash for the withdrawal amount is dispensed from the change machine 30c (S36).

As described above, the management apparatus 80 manages the inventory quantities of the plurality of change machines 30, and when the inventory quantity of the change machine 30 connected to the POS register 20 that has received the withdrawal amount is insufficient, the management apparatus 80 enables dispensing from a change machine 30 connected to another POS register 20, thereby reducing opportunity loss related to use of cash-out. Since the POS register 20 that has received the withdrawal amount issues the code for dispensing, reading of the debit card is not required when dispensing money from the change machine 30 connected to another POS register 20, thereby improving operability.

As described above, according to the present embodiment, the change machine 30 stores the inventory quantity data indicating the inventory quantity of money, and stores the quantity of money to be prepared for change, which is the primary purpose, as the reserved-for-change quantity data. When the POS register 20 has received a withdrawal amount for cash-out which is the secondary purpose, the change machine 30 determines whether or not dispensing of money for the withdrawal amount is possible, based on the inventory quantity data and the reserved-for-change quantity data. Upon determining that dispensing of money for the withdrawal amount cannot be performed, the change machine 30 makes a notification to that effect. This avoids a situation where money for change becomes insufficient due to cash-out and thereby cash settlements in subsequent transactions are impeded. Thus, smooth dispensing of money is realized.

The notification that dispensing of money cannot be performed may be made by the POS register 20 and/or the change machine 30. As described in the modifications, storage of the inventory quantity data and the reserved-for-change quantity data and determination as to possibility of dispensing can be performed by any apparatus such as the POS register 20, the change machine 30, or the management apparatus 80.

As for the inventory quantity data, it is preferable to use the inventory quantity of money that can be dispensed. When the inventory quantity of money that can be dispensed will become less than the denomination-specific quantity indicated in the reserved-for-change quantity data if money for the withdrawal amount is dispensed, it is determined that dispensing of money cannot be performed.

Even in a case where no withdrawal amount is received, the numbers of banknotes/coins available for cash-out can be displayed. In addition, a notification that promotes cash-out can be made for money of a denomination that exceeds a predetermined storage number. Such promotion of cash-out may be selectively performed for a specific denomination, such as 10,000-JPY notes, which are not dispensed as change. When it is determined that dispensing of money for the withdrawal amount cannot be performed, it is possible to change the withdrawal amount and/or the monetary composition for enabling the dispensing the money.

While the case where cash-out is performed upon receiving a withdrawal amount has been described in the present embodiment, cash-out can also be performed upon receiving designated denomination and number of banknotes/coins.

While the case where cash-out is independently performed has been described for simplification in the present embodiment, cash-out may be performed together with purchase of items. When cash-out is performed together with purchase of items, determination as to whether withdrawal for the cash-out is possible is performed, and a debit settlement is performed with a settlement amount that is the total of the purchase amount of items and the withdrawal amount for the cash-out.

While the coin handling unit 50 is provided with the withdrawal control unit in the present embodiment, the banknote handling unit 40 may be provided with the withdrawal control unit. Alternatively, a host control unit may be connected to the coin handling unit 50 and the banknote handling unit 40, and the host control unit may be caused to function as the withdrawal control unit.

In the present embodiment, the banknote handling unit 40 is provided with the banknote memory unit 48, the coin handling unit 50 is provided with the coin memory unit 58, and the banknote memory unit 48 and the coin handling unit 50 are caused to store an inventory quantity and a reserved-for-change quantity, respectively. However, the present invention is not limited thereto. For example, a common memory may be shared by the banknote handling unit 40 and the coin handling unit 50. The common memory may be included in either the coin handling unit 50 or the banknote handling unit 40, or may be included in the host control unit connected to the coin handling unit 50 and the banknote handling unit 40.

In the present embodiment, the coin handling unit 50 is communicably connected to the POS register 20, and the banknote handling unit 40 communicates with the POS register 20 via the coin handling unit 50. However, the present invention is not limited thereto. For example, the banknote handling unit 40 may be communicably connected to the POS register 20, and the coin handling unit 50 may communicate with the POS register 20 via the banknote handling unit 40. Alternatively, each of the coin handling unit 50 and the banknote handling unit 40 may be communicably connected to the POS register 20 so as to be directly communicable with the POS register 20.

In the present embodiment, the change machine that dispenses money for two purposes, i.e., dispensing of change and cash-out, has been described, and smooth dispensing of money is realized while preventing dispensing of change, which is the primary purpose, from being impeded. However, the present invention is not limited thereto. For example, the present invention is also applicable to cash-out at a station ticket machine, and refund for an item with a change machine. The purposes of dispensing of money, such as money exchange at a change machine and cash-out at a money changer, and combination thereof are not limited. Furthermore, the present invention is also applicable to an apparatus that dispenses money for three or more purposes, such as money exchange and cash-out at a change machine.

The constituent elements described in the above embodiment are conceptually functional constituent elements, and thus may not be necessarily configured as physical constituent elements, as illustrated in the drawings. That is, distributed or integrated forms of each device are not limited to the forms illustrated in the drawings, and all or some of the forms may be distributed or integrated functionally or physically in any unit depending on various loads, use statuses, or the like.

INDUSTRIAL APPLICABILITY

The money dispensing management apparatus, the money dispensing management system, the money dispensing management method, and the money dispensing management program according to the present invention are useful in smoothly dispensing money for multiple purposes.

DESCRIPTION OF THE REFERENCE CHARACTERS 20, 20a, 20b, 20c POS register
21 Display/operation unit
21a, 21b, 73 Display unit
21c, 74 Operation unit
22 Barcode reader
23, 72 Card reader
24 Printing unit
25, 49a, 59a, 71 Communication unit
26 POS control unit
26a Purchase item registration unit
26b Purchase amount calculation unit
26c Settlement unit
26d Withdrawal reception unit
30, 30a, 30b, 30c Change machine
40 Banknote handling unit
41 Banknote depositing unit
41a Banknote inlet
42 Banknote dispensing unit
42a Banknote outlet
43 Dispensing reject unit
44 Cassette mounting unit
45 Rotary transport unit
46 Banknote recognition unit
47 Banknote storage unit
48 Banknote memory unit
48a Banknote inventory quantity data
48b, 58b Reserved-for-change quantity data
49 Banknote change control unit
49b, 59b Depositing processing unit
49c, 59c Dispensing processing unit
50 Coin handling unit
51 Coin inlet
52 Deposited coin transport unit
52a Coin recognition unit
53 Coin storage unit
54 Dispensed coin transport unit
55 Coin outlet
56 Display/operation unit
58 Coin memory unit
58a Coin inventory quantity data
59 Coin change control unit
59d Withdrawal control unit
60 Banknote cassette
70 Debit terminal
75 Controller
75a Authentication data reception unit 75b Debit settlement unit
80 Management apparatus
100 Management server
110 Bank server

The invention claimed is:

1. A money dispensing management apparatus, comprising:
a memory that stores inventory quantity information indicating an inventory quantity of money, and first money information regarding money to be reserved for a primary purpose that is to dispense money as change; and
processing circuitry configured to
acquire second money information indicating money to be used for a secondary purpose that is a purpose other than to dispense money as change,
determine whether or not the money indicated in the acquired second money information can be dispensed, based on the inventory quantity information and the first money information, and
in response to determining that the money indicated in the acquired second money information cannot be dispensed, perform notification control to notify that dispensing of the money indicated in the acquired second money information cannot be performed.

2. The money dispensing management apparatus according to claim 1, further comprising a notification unit configured to output a notification that dispensing of the money indicated in the acquired second money information cannot be performed, based on the notification control performed by the processing circuitry.

3. The money dispensing management apparatus according to claim 1, wherein
the memory stores, as the inventory quantity information, a denomination-specific quantity for each denomination of money that is being stored in the money dispensing management apparatus and dispensable from the money dispensing management apparatus, and
when a denomination-specific quantity of dispensable money will become less than a denomination-specific quantity for each denomination of money indicated in the first money information when the money indicated in the second money information is dispensed, the processing circuitry determines that dispensing of the money indicated in the second money information cannot be performed.

4. The money dispensing management apparatus according to claim 1, wherein
the memory stores, as the inventory quantity information, a denomination-specific quantity for each denomination of money that is being stored in the money dispensing management apparatus and dispensable from the money dispensing management apparatus,
when a denomination-specific quantity of dispensable money will become less than a denomination-specific quantity for each denomination of money indicated in the first money information when the money indicated in the second money information is dispensed, the processing circuitry sets a limitation on dispensing of money to be performed based on the second money information, and
after the setting, when the dispensing of money performed based on the second money information has reached the limitation, the processing circuitry determines that dispensing of money indicated in the second money information cannot be performed.

5. The money dispensing management apparatus according to claim 1, wherein the processing circuitry is further configured to perform notification control to notify information regarding money that is dispensable for the secondary purpose.

6. The money dispensing management apparatus according to claim 1, wherein
when the inventory quantity information indicates that there is a denomination of which a storage quantity exceeds a predetermined storage quantity, the processing circuitry further performs notification control to promote dispensing of money of the denomination for the secondary purpose.

7. The money dispensing management apparatus according to claim 1, wherein the processing circuitry is further configured to perform notification control to promote dispensing of money of a predetermined denomination for the secondary purpose.

8. The money dispensing management apparatus according to claim 1, wherein
the secondary purpose is to deduct an amount of money from an account balance of a user and dispensing money corresponding to the deducted amount.

9. The money dispensing management apparatus according to claim 1, wherein
when it is determined that dispensing of the money indicated in the second money information cannot be performed, the processing circuitry changes at least one of the denomination of the money and the quantity of the money so as to be within a dispensable range, and thereafter performs dispensing of the money.

10. A money dispensing management system, comprising:
a memory that stores inventory quantity information indicating an inventory quantity of money being stored in a cash handling apparatus configured to dispense change for transactions, and first money information regarding money to be reserved in the cash handling apparatus for dispensing the change; and
processing circuitry configured to
acquire second money information indicating money to be used for a purpose other than to dispense money as change,
determine whether or not the money indicated in the acquired second money information can be dispensed from the cash handling apparatus, based on the inventory quantity information and the first money information, and
perform notification control to notify a result of the determination.

11. A money dispensing management method, comprising:
storing, in a memory, inventory quantity information indicating an inventory quantity of money and first money information regarding money to be reserved for a primary purpose that is to dispense money as change;
acquiring second money information indicating money to be used for a secondary purpose that is a purpose other than to dispense money as change;
determining whether or not the money indicated in the acquired second money information can be dispensed, based on the inventory quantity information and the first money information; and
in response to determining that the money indicated in the acquired second money information cannot be dispensed, performing notification control to notify that dispensing of the money indicated in the acquired second money information cannot be performed.

\* \* \* \* \*